March 17, 1953        J. DAUGHERTY        2,631,503
HYDRAULIC TABLE STOP
Filed April 26, 1950        2 SHEETS—SHEET 1
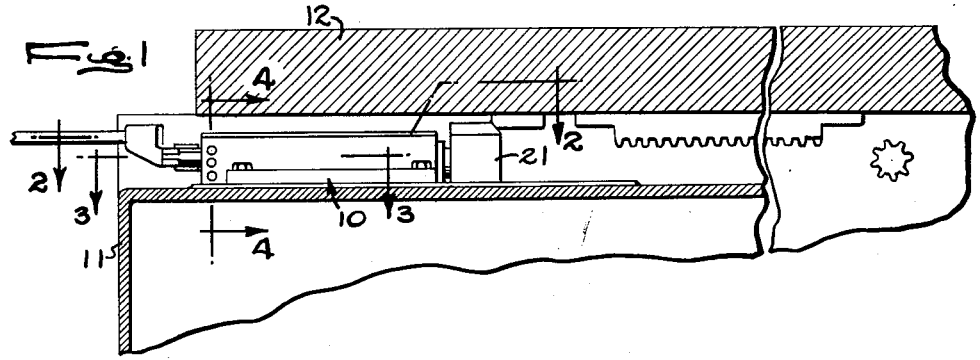
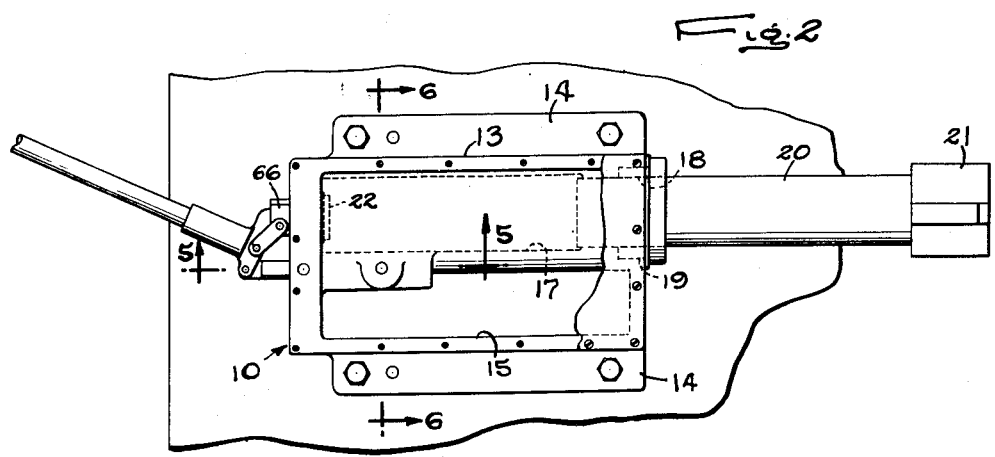
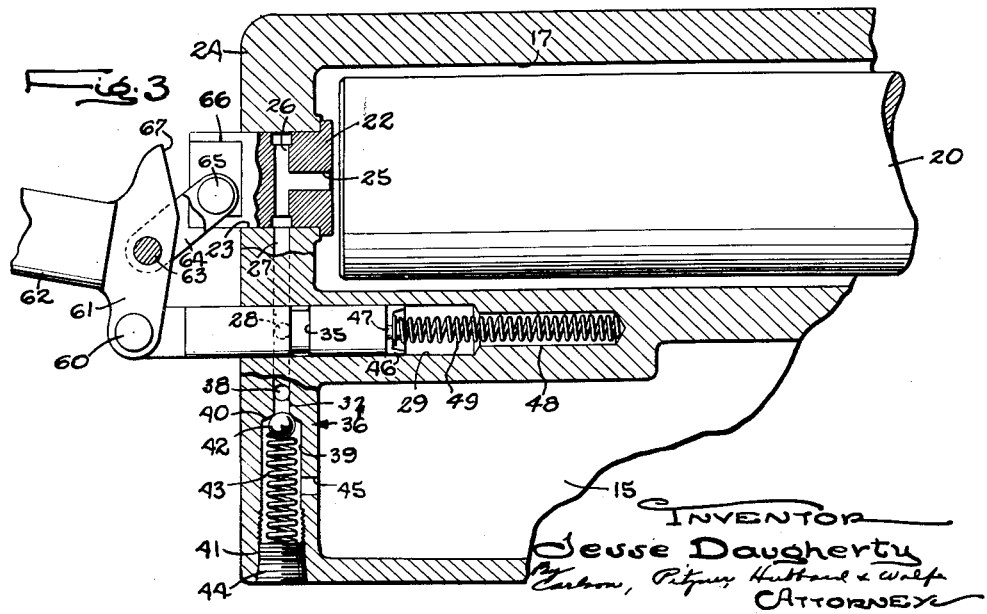
INVENTOR
Jesse Daugherty
ATTORNEYS

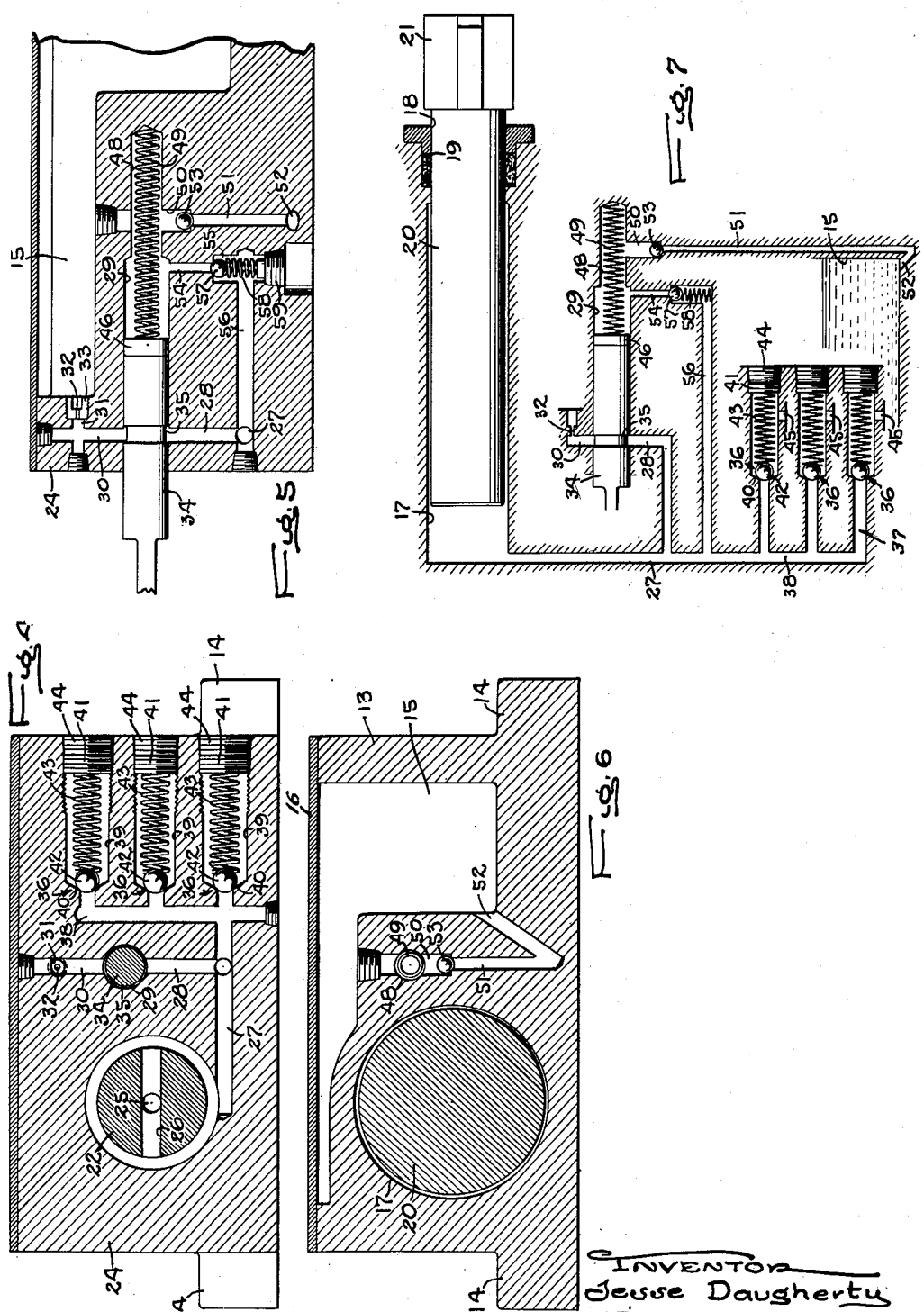

Patented Mar. 17, 1953

2,631,503

UNITED STATES PATENT OFFICE 2,631,503

HYDRAULIC TABLE STOP

Jesse Daugherty, Fond du Lac, Wis., assignor, by mesne assignments, to Giddings & Lewis Machine Tool Company, Fond du Lac, Wis., a corporation of Wisconsin Application April 26, 1950, Serial No. 158,308

9 Claims. (Cl. 90—58)

The present invention relates to a new and improved hydraulic table stop for limiting the extent of movement of the table of a metal planer or other similar machine tool in the event of over-travel beyond the normal working range, and for expeditiously returning the table after any such over-travel to the working range in condition for operation.

The invention is especially applicable for use in connection with high speed reciprocatory tables such as are commonly employed in metal planers. The reciprocatory drive most commonly in use includes a longitudinal gear rack fixed on the underside of the table and meshing with a bull gear journalled in the underlying bed and connected for operation from a reversing motor. In such an arrangement, the maximum normal working range of the table on the bed is determined by the effective length of the gear rack, and the operating stroke within this range is usually predetermined by means of reversing dogs adjustably mounted on one side of the table and arranged for coaction with a limit switch on the contiguous side of the bed to control the reversing drive motor for the bull gear. If the table were to over-travel the normal working range, as might occur in the event of failure or misadjustment of the reversing control means, the gear rack would run off the bull gear, and thereby interrupt the mechanical drive. Thereupon, the over-travel would be uncontrolled and substantially unimpeded, and due to momentum, especially at high speeds, would be a source of considerable danger. Thus, there would be the resultant likelihood of injury to operating personnel, damage to other adjacent machinery and building structures, and, in any event, loss of time in reconditioning the machine for normal operation. The likelihood of injury and damage in the event of a runaway table is, of course, most pronounced at modern planer table speeds which may attain and even exceed 300 feet per minute. The hydraulic table stop of the present invention is provided to overcome effectively the foregoing difficulties.

One of the objects of the present invention is to provide a table stop which will come into operation directly upon disengagement of the table gear rack from the bull gear, and which will act as a snubbing device to absorb the kinetic energy of the table and bring it smoothly to a stop before it can leave the ways of the machine bed.

It is another object of the invention to provide means associated with the table stop whereby the table may be forced back into the normal working range to effect operative re-engagement between the gear rack and the bull gear.

Still another object of the invention is to provide a self-contained unit adapted to be mounted on the machine bed in the path of one end of the table and comprising a main ram arranged for engagement by the table in the event of over-travel so as to interpose a yielding resistance to check the over-travel and additionally comprising an hydraulic jack for actuating the ram as an impelling element to push back the table into the normal working range.

Another object is to provide an hydraulic table stop of the foregoing character in which the fluid resisting the receding movement of the ram under the force of impact and momentum imparted thereto by the table is susceptible of being relieved effectively under all conditions of operation so as to avoid any possibility of damage to the stop mechanism.

A further object is to provide an hydraulic table stop in which the fluid is normally relieved through a restricted flow passage or orifice of predetermined flow area so as to assure that there will be no rebound of the table in the event of slight over-travel at low speeds of operation with resultant damage to the teeth of the bull gear, and in which the fluid will be relieved in any event upon the attainment of a predetermined maximum pressure in the ram cylinder.

Other objects and advantages will become apparent as the description proceeds.

In the accompanying drawings:

Figure 1 is a fragmentary longitudinal vertical sectional view of a planer provided with an hydraulic table stop embodying the features of the present invention, the stop being shown in side elevation.

Fig. 2 is an enlarged fragmentary plan view of the table stop taken along line 2—2 of Fig. 1.

Fig. 3 is a fragmentary horizontal sectional view taken along line 3—3 of Fig. 1.

Fig. 4 is a transverse vertical sectional view taken along line 4—4 of Fig. 1.

Fig. 5 is a fragmentary longitudinal vertical sectional view taken along line 5—5 of Fig. 2.

Fig. 6 is a transverse vertical sectional view taken along line 6—6 of Fig. 2.

Fig. 7 is a diagrammatic representation of the hydraulic system embodied in the hydraulic table stop.

Referring more particularly to the drawings, the table stop constituting the exemplary embodiment of the present invention is indicated generally by the numeral 10 and is shown mounted upon one end of the bed 11 in the path of one end of a longitudinally reciprocable table 12 of a machine tool. Although the hydraulic table stop is susceptible of advantageous use in various types of machine tools, it is especially useful in modern high speed metal planers as hereinbefore described. The details of construction of the planer, other than the bed 11 and table 12, are not fully disclosed, and for a typical construction, reference may be had to my prior Patent No. 2,430,760, issued November 11, 1947. The hydraulic table stop here disclosed is an improvement of the stop disclosed in the aforesaid patent, and the present application is a continuation-in-part of my co-pending application Serial No. 646,580, filed February 9, 1946, for Hydraulic Table Stop, and now abandoned.

The hydraulic table stop 10 is a self-contained unit comprising a housing or casing 13 adapted to be securely mounted in fixed position on one end of the bed 11 between the table ways. In the present instance, the casing 13 is generally rectangular in shape and is provided with marginal side flanges 14 suitably bolted or otherwise secured in position. The casing 13 is hollow to define a liquid reservoir 15 closed at the top by a suitable cover plate.

Integrally formed in one side of the casing, extending longitudinally thereof in substantial alinement with the longitudinal center of the table 12, is an hydraulic cylinder 17 which is closed at the outer end and which is formed with an axial bearing opening 18 at the inner end provided with a suitable packing 19. A reciprocable ram 20 extends with a close sliding fit through the bearing opening 18 and packing 19 into the hydraulic cylinder 17. Preferably, the ram 20 is of solid cylindrical form, and the inner end thereof extends in closely but peripherally spaced relation to the inner cylindrical surface of the cylinder 17. The outer end of the ram 20 is provided with an enlarged abutment 21 which is disposed for end engagement by the contiguous end of the table 12 upon over-travel of the latter to the left beyond the normal maximum range of reciprocation afforded by the reciprocatory drive.

Conditioned for operation, the ram is located in projected position, as illustrated in Fig. 2, and the hydraulic cylinder 17 is completely filled with a non-compressible fluid, such as oil, conditioned to resist inward movement of the ram 20. Means is provided for maintaining the fluid in the hydralic cylinder 17 under pressure and at the same time to relieve the fluid without fail so that the ram may recede into the cylinder to absorb smoothly and progressively the kinetic energy of the table 12. More particularly, a flanged block 22 is tightly fitted in a central opening 23 in the closed end wall 24 of the cylinder 17, and is formed with an axial ingress and egress port 25. The latter communicates with a transverse passage 26 in the block 22 connected with an alined passage 27 in the cylinder wall 24. The passage 27 extends horizontally but intersects the lower end of a vertical passage 28 which opens to a cylinder bore 29 formed in the casing 13 and extending parallel to the cylinder 17. Also opening to the bore 29 in the same transverse plane as the passage 28, and preferably in axial alinement therewith, a passage 30 intersecting a cross-passage 31 opening to the reservoir 15. A suitable restricted orifice 32 is interposed in the outlet end of the cross-passage 31 to control the escape or relief of fluid under pressure from the cylinder 17 through the port and passages 25, 26, 27, 28 and 30. Preferably, the orifice is formed in a plug 33 which is removably threaded into the inner end of the cross-passage 31 so that a plug with any predetermined or selected orifice area may be provided.

Reciprocable in the cylinder bore 29, and projecting therefrom at one end for external actuation, is a cylindrical plunger 34 which has a valving function with reference to the passages 28 and 30. To this end, the plunger 34 is formed with a peripheral groove 35 which is adapted to be moved into position to connect the passages 28 and 30 and thereby establish a flow connection for the relief or escape of fluid from the cylinder 17 through the orifice 32 to the reservoir 15.

If, for any reason, the plunger 34 should not be in position of adjustment to establish communication between the passages 28 and 30 through the groove 35 at any time that the heavy, fast moving table 12 on over-travel engages the abutment 21, then the stop 10 would be subject to severe damage or even disruption unless some other path of fluid relief is present. According to the present invention, fluid trapped in the closed end of the cylinder 17 is subject to relief at a predetermined safe pressure independently of any relief through the orifice 32. More particularly, the passage 27 at the upstream side of the valve bore 29 is in constant communication with pressure responsive relief valve means arranged to discharge any fluid passing therethrough to the reservoir 15. Any suitable number of relief valves, operating alone or in parallel, may be provided, depending on the flow capacity. Thus, a single relief valve of relatively large capacity may be employed or, if desired, a bank of similar valves, each of relatively smaller capacity, may be employed. In the present instance, three relief valves 36 of like construction and capacity, and preferably set to open at substantially the same pressure, are shown. These valves have inlet connections in parallel through branch passages 37 intersecting with a passage 38 in turn intersecting with the passage 27. By providing a plurality of relief valves 36, adequate aggregate capacity for relief of the pressure fluid in the cylinder 17 is assured, regardless of whether or not the relief orifice 32 is operatively connected.

Each of the relief valves 36 comprises a valve chamber defined by a bore 39 in the end wall of the casing 13. The inner end of the chamber 39 is formed with an annular conical valve seat 40, and the outer end thereof is closed by a screw plug 41 adjustably threaded therein. A ball 42 normally engages the seat 40 to close the valve and is urged against the seat by a coiled compression spring 43 located within the chamber 39 and seated at the outer end against the plug 41. To prevent convenient tampering with the adjustment of the spring pressure, ready access to the plug 41 is prevented by a tapered closure plug 44 threaded into the extreme outer end of the bore 39 and requiring a special tool for effecting removal. The valve chamber 39 opens to the reservoir 15 through a short passage 45 in one side wall.

In operation, if the table 12 should run off the bull gear in an over-travel beyond the normal working range, it will immediately contact the abutment 21 on the outer end of the ram 20, and tend to move the latter leftwardly into the cylinder 17. The hydraulic fluid trapped in the cylinder 17 and connected passages will, however, resist such inward movement of the ram 20. Assuming that the plunger 34 is properly adjusted to connect the passages 28 and 30, the entrapped hydraulic fluid will be gradually relieved through the restricted orifice 32 to the reservoir 15, thus permitting a smooth retractile movement of the ram 20 with the table 12 to snub and ultimately stop the latter before any damage can occur. In the event that the plunger 34 should be in a position in which the passages 28 and 30 are disconnected or the intercommunication therebetween is unduly restricted, thereby rendering the orifice 32 functionally ineffective, the pressure in the cylinder 17 will rise upon engagement of the table with the abutment 21, and when this pressure reaches the predetermined value for which the relief valves 36 are set, the hydraulic fluid will be relieved to permit retractible movement of the ram, thereby avoiding serious damage to the hydraulic table stop mechanism.

The relief valves 36 are thus effective the same as the restricted orifice 32 in permitting proper functioning of the hydraulic table stop. If solely relied upon, they would interpose a substantially constant resistance or stopping force throughout the length of ram travel. If, as might happen, for example, at low table speeds, the table were to over-travel only slightly and then come to a stop, the constant stopping force imposed by the relief valves would tend to react through the ram to reverse the movement of the table and thereby return the gear rack into clashing engagement with the bull gear. By providing the restricted orifice 32, which is normally open through the interconnecting system of passages to the cylinder 17, such undesirable rebound of the table, with attendant damage to the teeth of the bull gear is effectually avoided.

The plunger 34 is advantageously used as the operating element of a hand pump or hydraulic jack for forcing the ram outwardly after any table over-travel to return the table 12 back into operative association with the bull gear. To this end, the bore 29 constitutes a pump cylinder in which the plunger 34 is reciprocable as a pump piston. A suitable flexible cup-shaped gasket 46 may be attached to the inner end of the piston 34 by means of a bolt 47. Opening axially from the inner end of the cylinder bore 29 is an extension bore 48. A coiled compression spring 49 is seated in the bore 48 and extends therefrom through the inner end portion of the cylinder bore 29 into engagement with the inner end of the piston 34, and tends to urge the latter outwardly so as normally to maintain the groove 35 in full registration with the passages 28 and 30.

The cylinder bore 29 has a suction inlet connection with the reservoir 15. In the present instance, this connection comprises a relatively large bore 50 transversely intersecting the extension bore 48 and constituting a check-valve chamber. One end of the chamber 50 is connected through a passage 51 to a transverse passage 52 formed in the peripheral wall of the cylinder 17 and in free communication with the lower portion of the reservoir 15. A ball 53 is loosely disposed in the valve chamber 50 and adapted to seat by gravity against the outlet edge of the passage 51. It will thus be evident that on the outward or suction stroke of the pump piston 34 fluid will enter through the passages 52 and 51 and pass the check-valve 50, 53 freely to the bore 48 to fill the cylinder bore 29, and that upon the inward or pressure stroke of the piston the ball 53 will seat to prevent reverse flow to the passage 51.

The cylinder bore 29 has a pressure discharge connection with the ram cylinder 17. In the present instance, the pressure discharge connection comprises a passage 54 opening downwardly from the inner end of the bore 29 to an enlarged bore 55 constituting a check-valve chamber. The latter communicates through a passage 56 connected with the passage 27 which is always in open communication with the closed end of the cylinder bore 17. A ball 57 is normally held against the edge of the outlet or valve seat of the passage 54 by means of a coiled compression spring 58 within the chamber 55. A screw plug 59 serves to close the chamber 55 and to maintain the spring 58 under light operating pressure. It will be evident that upon the outward or suction stroke of the piston 34, the ball valve 57 will block the passage 54 to prevent the intake of hydraulic fluid from the ram cylinder 17, and that during the inward or pressure stroke of the piston fluid will be discharged through the passage 54, past the check-valve 55, 57 and thence through the passages 56, 27, 26 and 25 to the ram cylinder 17 so as to project the ram 20 hydraulically into normal position preparatory for the next operation.

Reciprocation of the pump or jack piston 34 may be accomplished by any suitable means. In the present instance, the outer end of the piston 34 is pivotally connected at 60 to one end of a cross-head 61 on a handle 62. The cross-head, in turn, is pivotally connected intermediate its ends, as at 63, to one end of a link 64, and the latter is pivotally connected at the other end, as at 65, to a block 66 rigidly fixed on the block 22. The end of the cross-head 61 opposite the pivot 60 is formed with an abutment surface 67 adapted to engage the block 66 to limit outward movement of the piston 34 and particularly to locate the latter in its idle position under the force of the spring 49 in which position the groove 35 is in full registration with the communicating ends of the passages 28 and 30.

In operation, actuation of the handle 62 to reciprocate the piston will pump fluid from the reservoir 15 to the ram cylinder 17, as previously described. In this pumping operation, the piston 34 is reciprocated preferably out of range of the openings to the passages 28 and 30 so that no portion of the hydraulic fluid will be by-passed through the orifice 32 back to the reservoir. Since the relief valves 36 are adjusted to open only at the relatively high relief pressures built up by the kinetic force of the table 12 as it acts against the ram 20, the hydraulic fluid delivered by the piston 34 will not unseat these valves but will pass to the ram cylinder 17 at the relatively low pressure required to force the ram outwardly to return the table to normal position.

It will be evident that I have provided a new and improved hydraulic table stop which is effective to snub and stop the table in the event of over-travel, and which is operable as a self-contained unit to return the table to normal position. The hydraulic table stop is simple and inexpensive in construction and may be placed upon any planer without necessitating re-design of the latter. The hydraulic table stop is reliable under all conditions of operation. If there should be but slight over-travel, the restricted orifice 32 will relieve fluid to prevent rebound at slow speeds. If, on occasion, the orifice 32 should be rendered functionally inoperative due to misadjustment of the plunger or piston 34, the relief valves 36 will be effective to relieve the hydraulic fluid at a safe pressure to prevent serious damage to the mechanical structure and at the same time permit a normal operation to snub and stop the table. At high speed table operations, both the restricted orifice 32 and the relief valves 36 are available to relieve hydraulic fluid.

I claim as my invention:

1. A hydraulic stop for decelerating and stopping a reciprocable machine tool element and comprising, in combination, a casing adapted to be mounted in fixed position in the path of said element and being formed with a hydraulic fluid reservoir and a working cylinder, a ram reciprocable in said cylinder and projecting therefrom for axial end engagement by said element in the direction of translation of said element, a restricted flow passage for relieving fluid from said cylinder to said reservoir upon inward movement of said ram, pumping means having a given capacity and operable at will to block said passage and to introduce fluid from said reservoir into said cylinder to move said ram outwardly into projected operative position, said pumping means when idle normally establishing an open path through said passage, and a second flow passage having fluid pressure release means associated therewith for relieving fluid from said cylinder to said reservoir upon attainment of a predetermined pressure as an incident to inward movement of said ram regardless of whether fluid is relieved through said restricted passage, said second passage having a flow capacity far larger than said given pump capacity.

2. A hydraulic stop for decelerating and stopping a reciprocable machine tool element and comprising, in combination, a casing adapted to be mounted in fixed position in the path of said element and being formed with a hydraulic fluid reservoir and a working cylinder, a ram reciprocable in said cylinder and projecting therefrom for axial end engagement by said element in the direction of translation of said element, a restricted flow passage for relieving fluid from said cylinder to said reservoir upon inward movement of said ram, pumping means operable at will to block said passage and to introduce fluid from said reservoir into said cylinder to move said ram outwardly into projected operative position, said pumping means when idle normally establishing an open path through said passage, a second flow passage having a plurality of parallel branches for relieving fluid from said cylinder to said reservoir, and a plurality of adjustable spring-seated working-pressure relief valves interposed respectively in said branches and operable to pass fluid to said reservoir upon attainment of a predetermined pressure in said cylinder as an incident to inward movement of said ram regardless of any relief of fluid through said restricted flow passage.

3. A hydraulic table stop for a metal planer or the like which includes a table abutment associated with a piston riding in a hydraulic cylinder, decelerating means for said piston including a bleeding aperture in said cylinder, a hydraulic pump for returning said piston to its operative position, means associated with said pump for closing said bleeding aperture only when said hydraulic pump is being operated, and supplemental decelerating means for said piston operable independently of said first mentioned means upon attainment of a predetermined pressure in said cylinder.

4. A machine tool comprising, in combination, a support member, a translatable member mounted thereon for movement toward and from a predetermined position relative to said support member, combined hydraulic means automatically operable for arresting movement of said translatable member beyond said support and externally controlled to return said translatable member to said position, said means comprising a casing fixedly attached to one of said members and defining a cylinder therein, a ram reciprocably mounted in said cylinder and projecting therefrom into position to engage the other of said members when said translatable member passes beyond said position, a fluid reservoir in said casing, externally controlled pumping means disposed in said casing for pumping fluid from said reservoir into said cylinder to cause outward extension of said ram to move said translatable member to said position, means in said casing defining a fluid escape passageway between said cylinder and said reservoir, valve means including at least one release valve in said passageway, resilient means biasing said valve firmly into closed position, said valve being adapted to open against the force of said resilient means whenever the fluid pressure within said cylinder is increased above a predetermined level by momentum of said translatable member acting on said ram, the degree of opening of said valve varying proportionately with the amount to which said fluid pressure exceeds said predetermined level.

5. In a machine tool including a support member and a translatable member mounted thereon for movement toward and from a predetermined position relative to said support member, combined hydraulic means automatically operable for arresting movement of said translatable member beyond said position and externally controlled to return said translatable member to said position, said means comprising a casing adapted to be fixedly attached to one of said members and defining a cylinder therein, a ram reciprocably mounted in said cylinder and projecting therefrom, the free end of said ram being adapted to engage the other of said members when said translatable member passes beyond said position, a fluid reservoir in said casing, externally controlled pumping means disposed in said casing for pumping fluid from said reservoir into said cylinder to cause outward extension of said ram to move said translatable member to said position, means in said casing defining a fluid escape passageway between said cylinder and said reservoir, valve means including at least one release valve in said passageway, resilient means biasing said valve firmly into closed position, said valve being adapted to open against the force of said resilient means whenever the fluid pressure within said cylinder is increased above a predetermined level by momentum of said translatable member acting on said ram, the degree of opening of said valve varying proportionately with the amount to which said fluid pressure exceeds said predetermined level.

6. For use with a machine tool including a support member and a translatable member mounted thereon for movement toward and from a predetermined position relative to said support member, combined hydraulic means capable of automatic operation to arrest movement of said translatable member beyond said position and externally controllable to return said translatable member to said position, said means comprising a casing adapted to be attached to one of said members and defining a cylinder therein, a ram reciprocably mounted in said cylinder and normally projecting in extended position therefrom, the free outer end of said ram being adapted to engage the other of said members when said translatable member passes beyond said position, a fluid reservoir in said casing, externally controlled pumping means disposed in said casing for pumping fluid from said reservoir into said cylinder to cause outward projection of said ram to move said translatable member to said position, means in said casing defining a fluid escape passageway between said cylinder and said reservoir, pressure release valve means interposed in said passageway, said valve means being adapted to open whenever the fluid pressure within said cylinder is increased above a predetermined level by momentum of said translatable member acting on said ram.

7. The combined hydraulic means set forth in claim 6 further characterized by means defining a second and restricted flow passageway normally-open between said cylinder and said reservoir when said ram is out of retracted position for engagement with said other member, and shut-off means associated with said second passageway and interconnected with said pumping means to close off said second passageway as an incident to operation of said pumping means.

8. A machine tool comprising, in combination, a support member, a translatable member movable toward a predetermined position, a first means adapted to be mounted on one of said members and a second means reciprocably disposed thereon and projecting therefrom to engage the other of said members upon movement of said translatable member beyond said predetermined position, one of said means comprising a casing having formed therein a hydraulic fluid reservoir and a working cylinder, the other of said means comprising a ram reciprocably disposed in said cylinder and projecting therefrom, means defining a restricted flow passage between said cylinder and said reservoir for exhausting fluid from said cylinder to said reservoir upon actuation of said ram induced by movement of the translatable machine tool member beyond the predetermined position, and fluid pressure release means interconnected between said cylinder and said reservoir for exhausting fluid to said reservoir upon attainment of a predetermined pressure in said cylinder induced by said actuation of said ram.

9. For use with a machine tool having a support member, and a translatable member movable toward a predetermined position, a combined hydraulic stop and actuating unit comprising, in combination, a first means adapted to be mounted on one of the members and a second means reciprocably disposed thereon and projecting therefrom to engage the other of the members upon movement of the translatable member beyond the predetermined position, one of said means comprising a casing having formed therein a hydraulic fluid reservoir and a working cylinder, the other of said means comprising a ram reciprocably disposed in said cylinder and projecting therefrom, means defining a restricted flow passage between said cylinder and said reservoir for exhausting fluid from said cylinder to said reservoir upon actuation of said ram induced by movement of the translatable machine tool member beyond the predetermined position, fluid pressure release means interconnected between said cylinder and said reservoir for exhausting fluid to said reservoir upon attainment of a predetermined pressure in said cylinder by said actuation of said ram, pumping means in said casing communicating with said reservoir and said cylinder for forcing fluid into the latter chamber to return said ram to its initial position after said actuation thereof, and shut-off means associated with said pumping means and said restricted flow passage for closing off said passage as an incident to operation of said pumping means.

JESSE DAUGHERTY.

REFERENCES CITED

The following references are of record in the file of this patent:

UNITED STATES PATENTS

| Number | Name | Date |
|---|---|---|
| 240,044 | Shaw | Apr. 12, 1881 |
| 533,894 | Hill | Feb. 12, 1895 |
| 1,736,694 | Blau | Nov. 19, 1929 |
| 2,018,506 | Walker | Oct. 22, 1935 |
| 2,430,760 | Daugherty | Nov. 11, 1947 |
| 2,467,276 | Slater | Apr. 12, 1949 |